United States Patent
Yang et al.

(10) Patent No.: US 7,148,601 B2
(45) Date of Patent: Dec. 12, 2006

(54) BUILT-UP STATOR ASSEMBLY

(75) Inventors: Ching-Min Yang, Taipei (TW); Chin-Hson Chen, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 10/952,911

(22) Filed: Sep. 30, 2004

(65) Prior Publication Data

US 2006/0066170 A1   Mar. 30, 2006

(51) Int. Cl.
*H02K 1/06* (2006.01)
(52) U.S. Cl. ...................... 310/217; 310/218
(58) Field of Classification Search ......... 310/216–218
See application file for complete search history.

(56) References Cited

U.S. PATENT DOCUMENTS 6,504,284 B1 * 1/2003 Kazama et al. ............. 310/259
6,538,548 B1 * 3/2003 Akita et al. ................. 336/234
6,809,442 B1 * 10/2004 Kaneko et al. ............... 310/58

* cited by examiner

*Primary Examiner*—Tran Nguyen

(57) ABSTRACT

A built-up stator assembly comprises a plurality of magnetic guide members and each of the magnetic guide members further comprises a frame arm, a rib and a magnetic pole part. The frame arm with two ends provides a joining part at the two ends respectively. The rib with an inner end extends inward from the frame arm and is wound with a coil. The magnetic pole part is provided at the inner end. The stator assembly can be built up with the magnetic guide members by way of joining parts engaging with each other.

5 Claims, 12 Drawing Sheets

BUILT-UP STATOR ASSEMBLY

BACKGROUND OF THE INVENTION

1. Field of the Invention

The present invention is related to a built-up stator assembly and particularly to a stator assembly, which is composed of a plurality of magnetic guide members attached with coils.

2. Brief Description of the Related Art

Referring to FIGS. 1 and 2, a conventional stator radiator assembly is composed of a plurality of thin sliced magnetic guide plates being piled together. The stator assembly 11 comprises a central part 111, even number sets of rib parts 112 extending outward from the central part 111 and a magnetic pole part 123 at the end of rib part 112.

Due to restriction of the magnetic pole part 113, it is hard to wind the coil 114 on the rib parts 112.

Referring to FIGS. 3 and 4, another conventional stator assembly is composed of a plurality of thin sliced magnetic guide plates being piled together. The stator assembly 21 comprises a frame part 121, even number sets of ribs 112 extending outward from the frame part 121 and a magnetic pole part 123 at the end of rib part 122.

Due to restriction of the frame part 121 being closed, it is hard to wind the coil 124 on the rib parts of the stator assembly 12.

Although a special way for winding the coils 114, 124 up in the stator assemblies 11, 12 can be adopted, it is easy to scratch the coils 114, 124 and it is easy to occur short circuit.

Further, the preceding ways of winding spend much time so that not only productivity is affected but also the production cost is excessive high.

SUMMARY OF THE INVENTION

An object of the present invention is to provide a built-up stator assembly, which is for the coil being wound easily.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
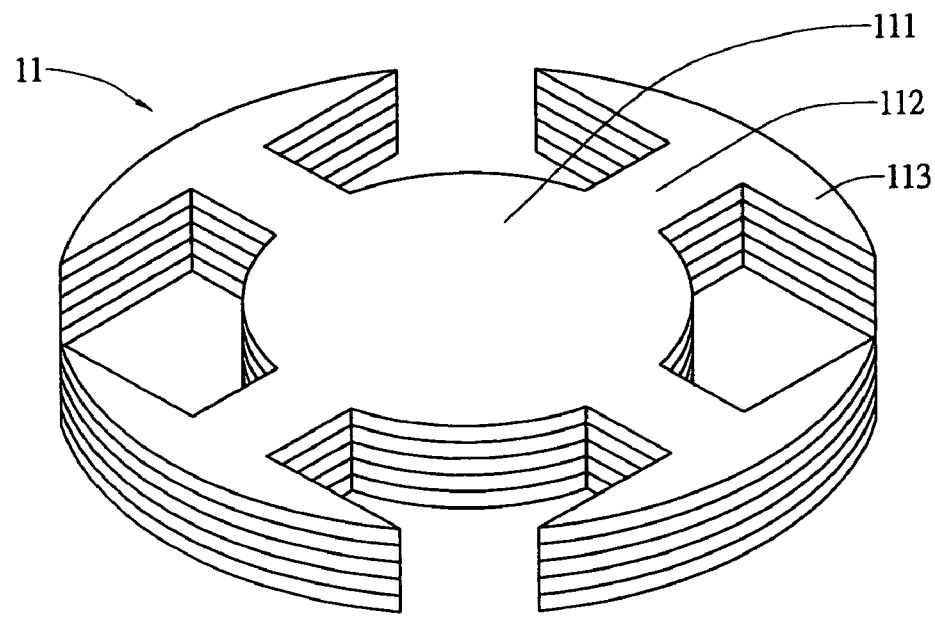
FIG. 1 is an exploded perspective view of a conventional stator assembly.
Figure 2:
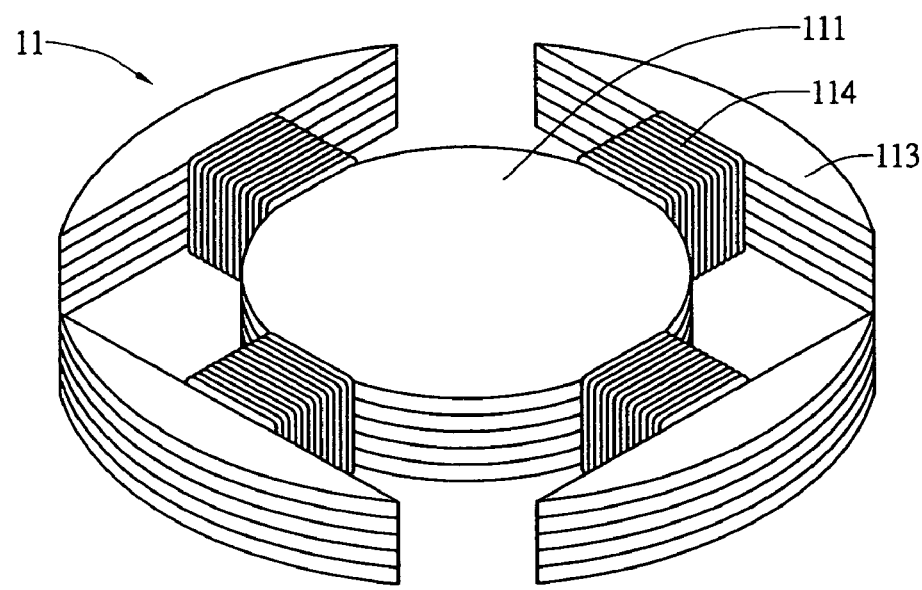
FIG. 2 is a perspective view of the conventional stator assembly.
Figure 3:
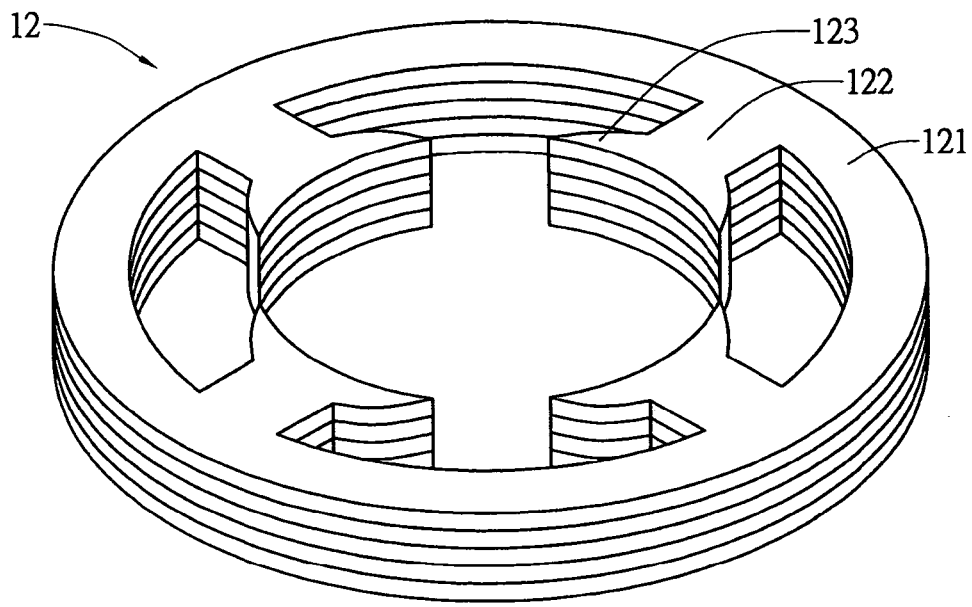
FIG. 3 is an exploded perspective view of another conventional stator assembly.
Figure 4:
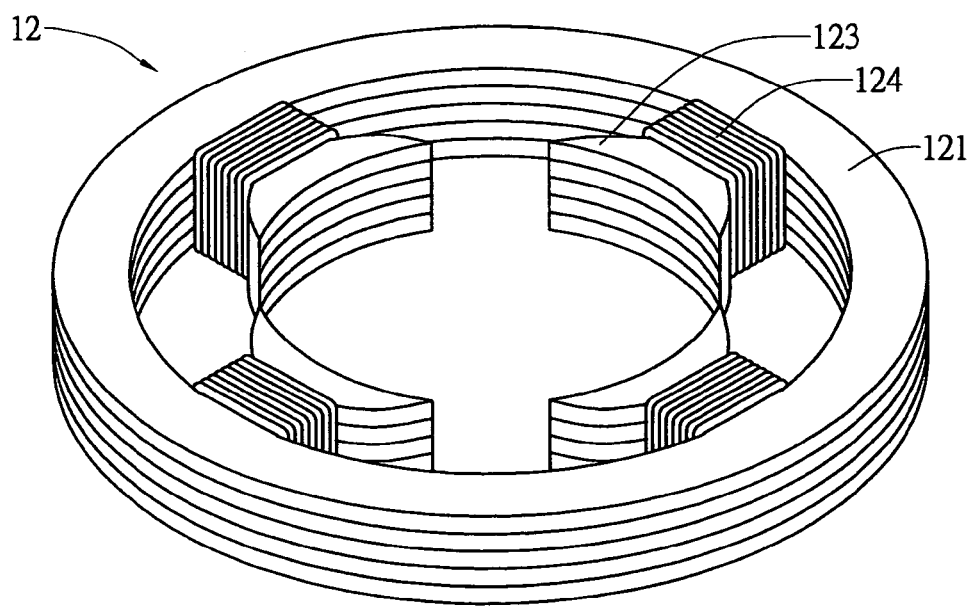
FIG. 4 is a perspective view of the conventional stator assembly shown in FIG. 3.
Figure 5:
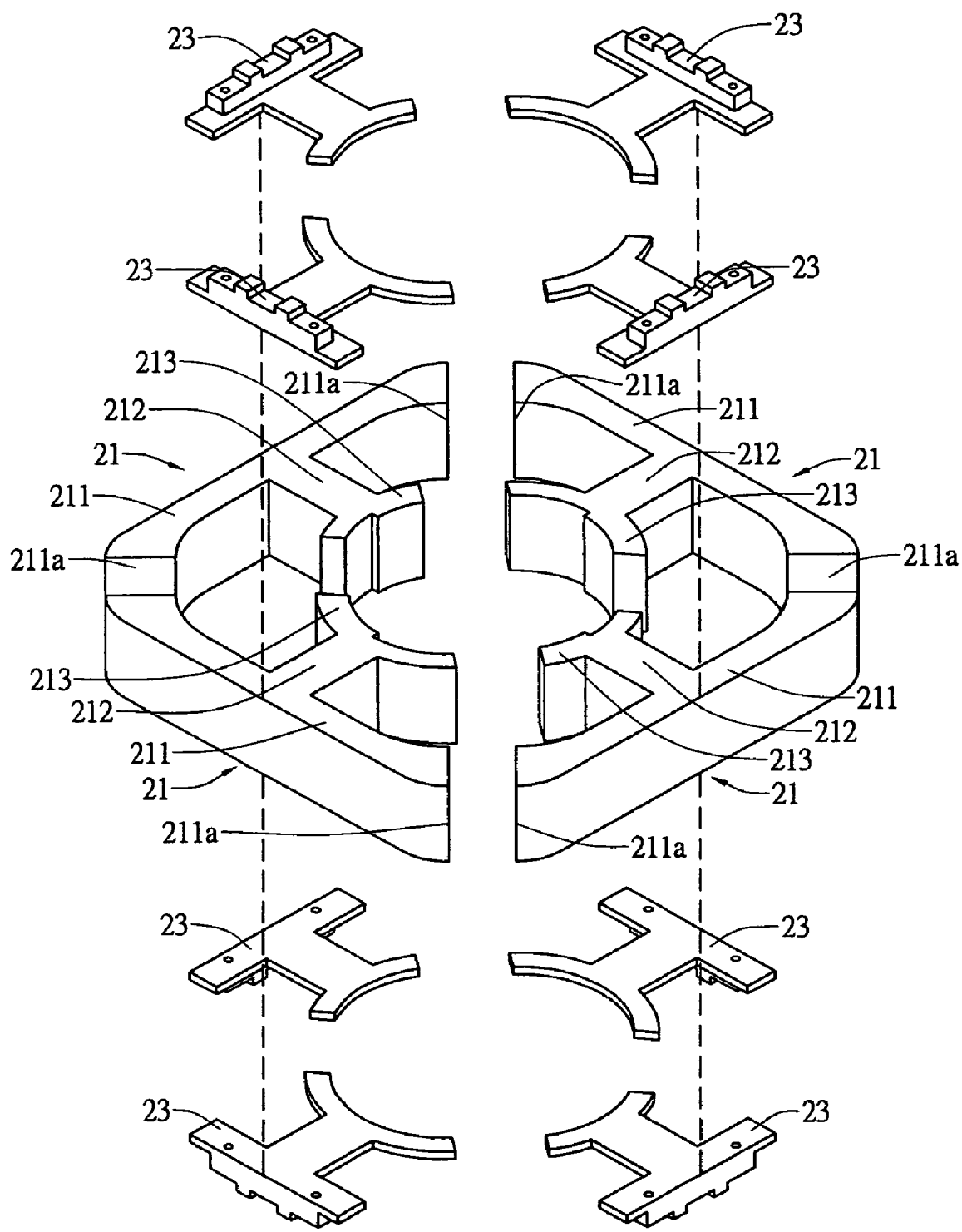
FIG. 5 is an exploded perspective view of the first preferred embodiment according to the present invention.
Figure 6:
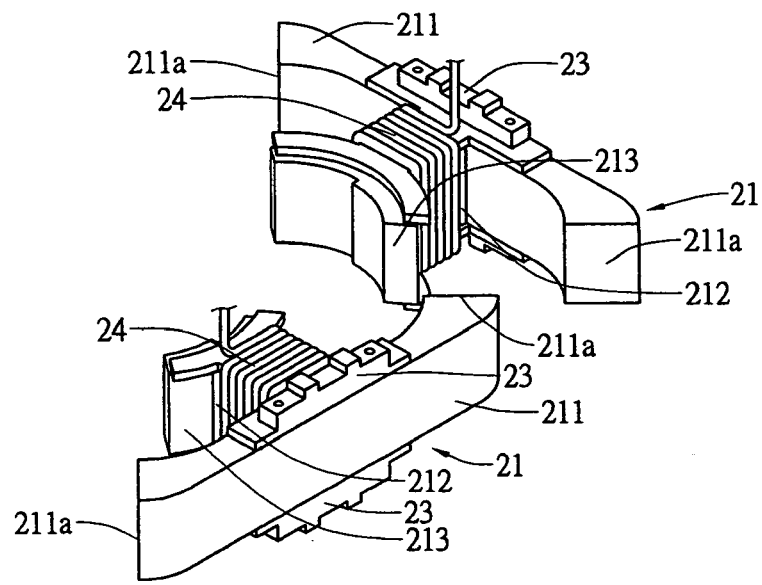
FIG. 6 is a perspective view illustrating the magnetic guide members being surrounded with coils.

Referring to FIGS. 5 and 6, a built-up stator assembly according to the present invention in the first embodiment thereof includes a plurality of sheet shaped magnetic guide plates piled together or is made with powder metallurgic method. The built-up stator assembly of the present invention includes four magnetic guide members 21 and each of the magnetic guide members 21 is formed with a plurality of the piled magnetic guide plates such that the respective magnetic guide member 21 has an elongated a frame arm 211, which extends inward a rib part 212 from the center of the inner side thereof and an arc magnetic pole 213 at the inner end of the rib part 212. Both ends of the frame arm 211 have a bent joining part 211a.

Figure 7:
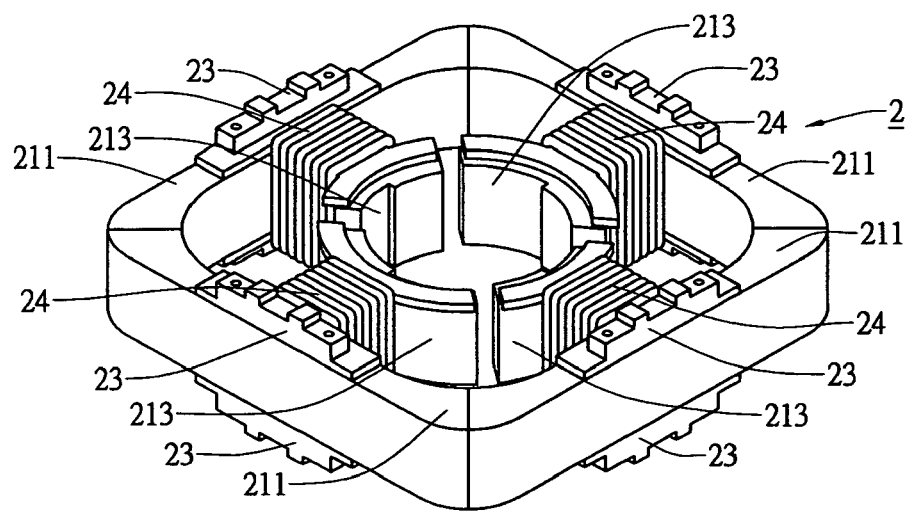
FIG. 7 is a perspective view of the first preferred embodiment according to the present invention.

Referring to FIG. 7, while in assembling, both lateral sides of respective magnetic guide member 21 are attached with an end plate 23, which has a shape similar to the magnetic guide plates and a coil 24 is wound to surround the rib part 211 and the end plates 23. Meanwhile, the frame arm 211 of each magnetic guide member 21 is independent from each other instead of being integrally made as a single piece like the frame part 11 of the conventional stator module 1. Thus, the coil 24 is capable of being individually wound to surround both the rib part 211 and the end plates 23 of each magnetic guide member 21 easily without any obstacles.

Figure 8:
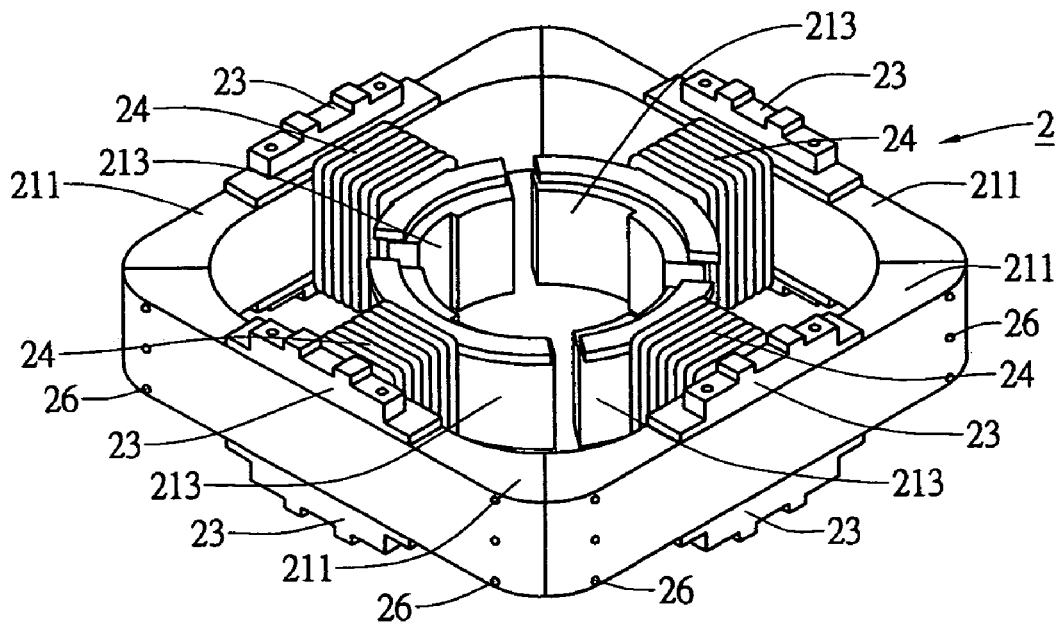
FIG. 8 is a perspective view illustrating the magnetic guide members being joined to each other with rivets.
Figure 9:
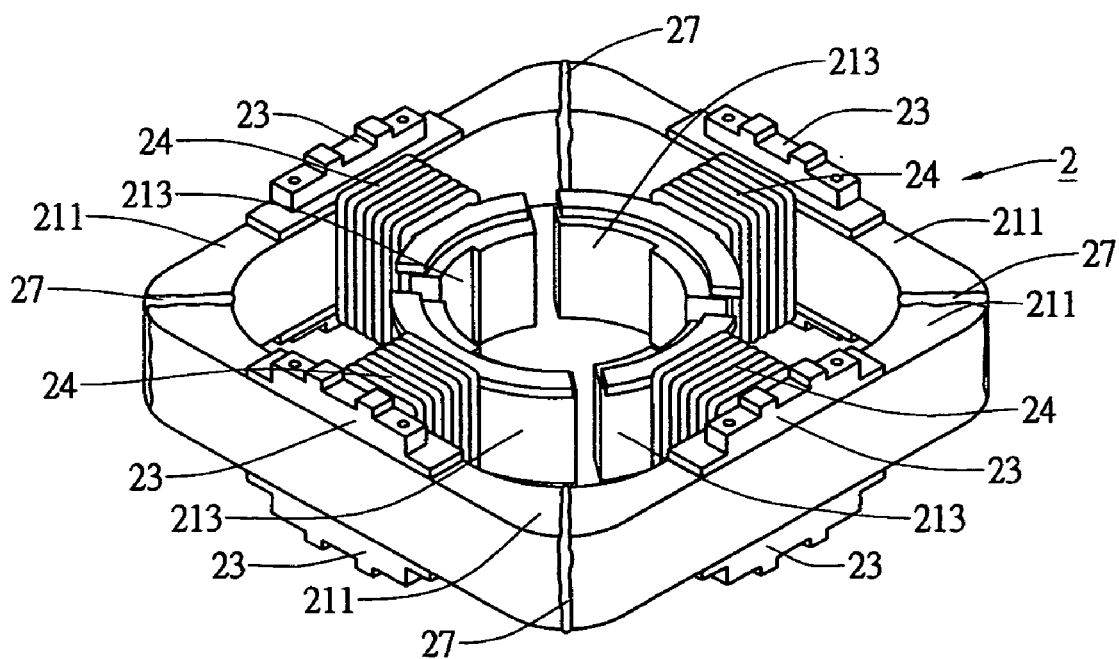
FIG. 9 is a perspective view illustrating the magnetic guide members being joined to each other with adhesives.
Figure 10:
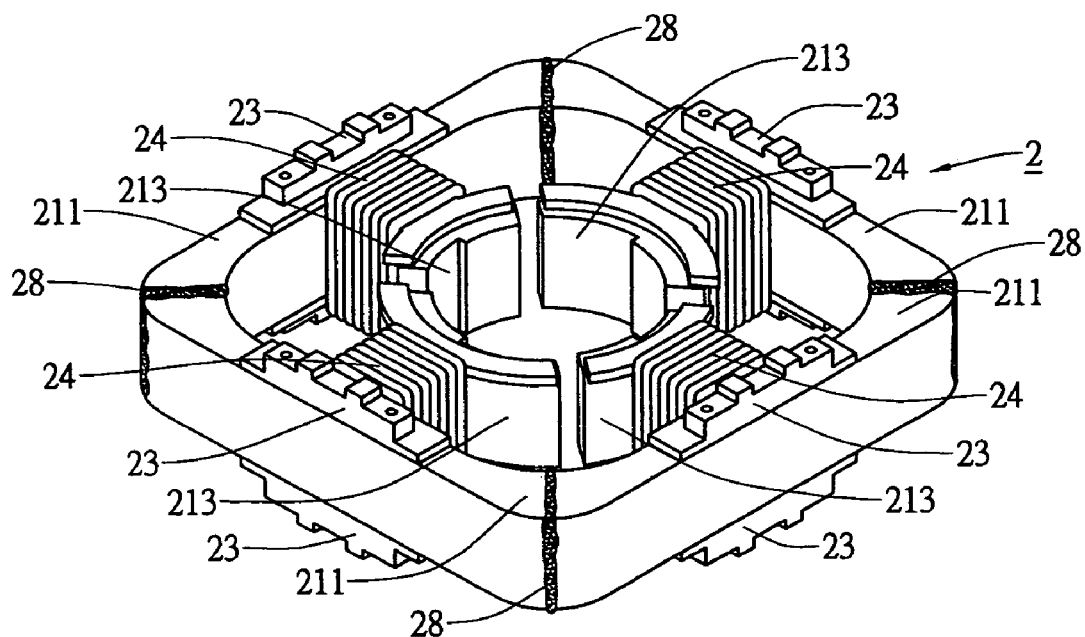
FIG. 10 is a perspective view illustrating the magnetic guide members being joined to each other with welding.

Further, the bent joining parts 211a at both ends of the respective magnetic guide member 21 are used for joining another bent joining part 211 of two magnetic guide members 21 next to it respectively so that a square stator assembly can be set up and there are many ways to enhance the connection between the joining parts. Referring to FIG. 8, rivets 26 are used to engage with the adjacent joining parts 211a of the frame arms 211 on the magnetic members 21. Referring to FIG. 9, adhesive 27 can be coated on the joining parts 211a and the adjacent joining parts 211a can be engage to each other. Referring to FIG. 10, the adjacent joining parts 211a can be joined to each other with soldering tin 28.

Figure 11:
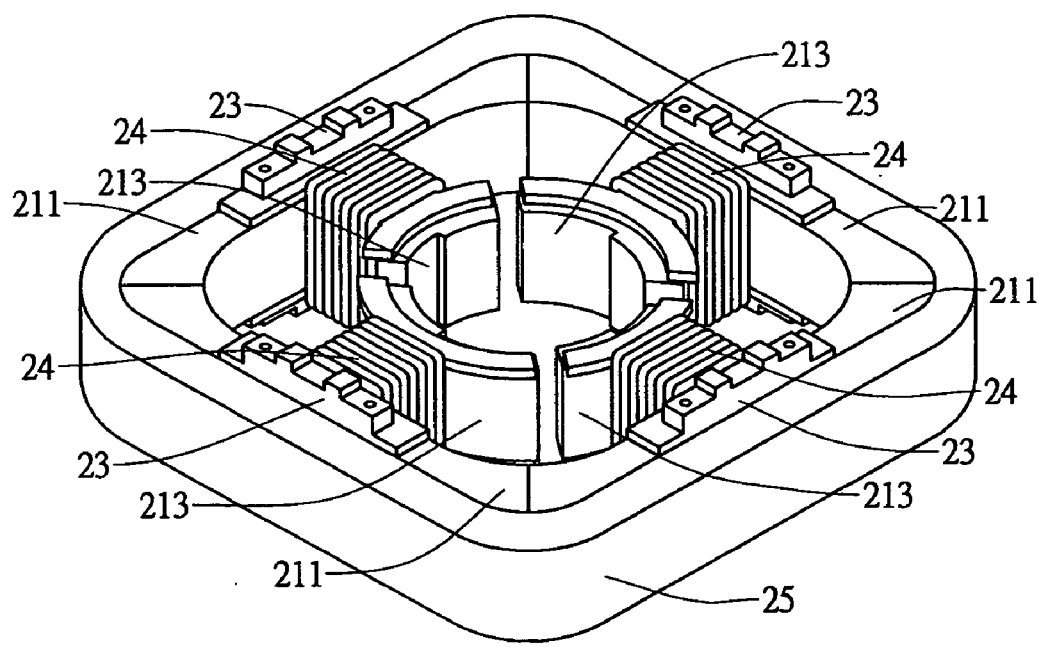
FIG. 11 is a perspective view of the second preferred embodiment according to the present invention.

Referring to FIG. 11, the second embodiment of the present invention is illustrated. The frame arms 211 of the magnetic guide members 21 at the outer side thereof can be surrounded with a square frame member 25 such that the magnetic guide members 21 can be attached to each other with the frame member 25 firmly.

Figure 12:
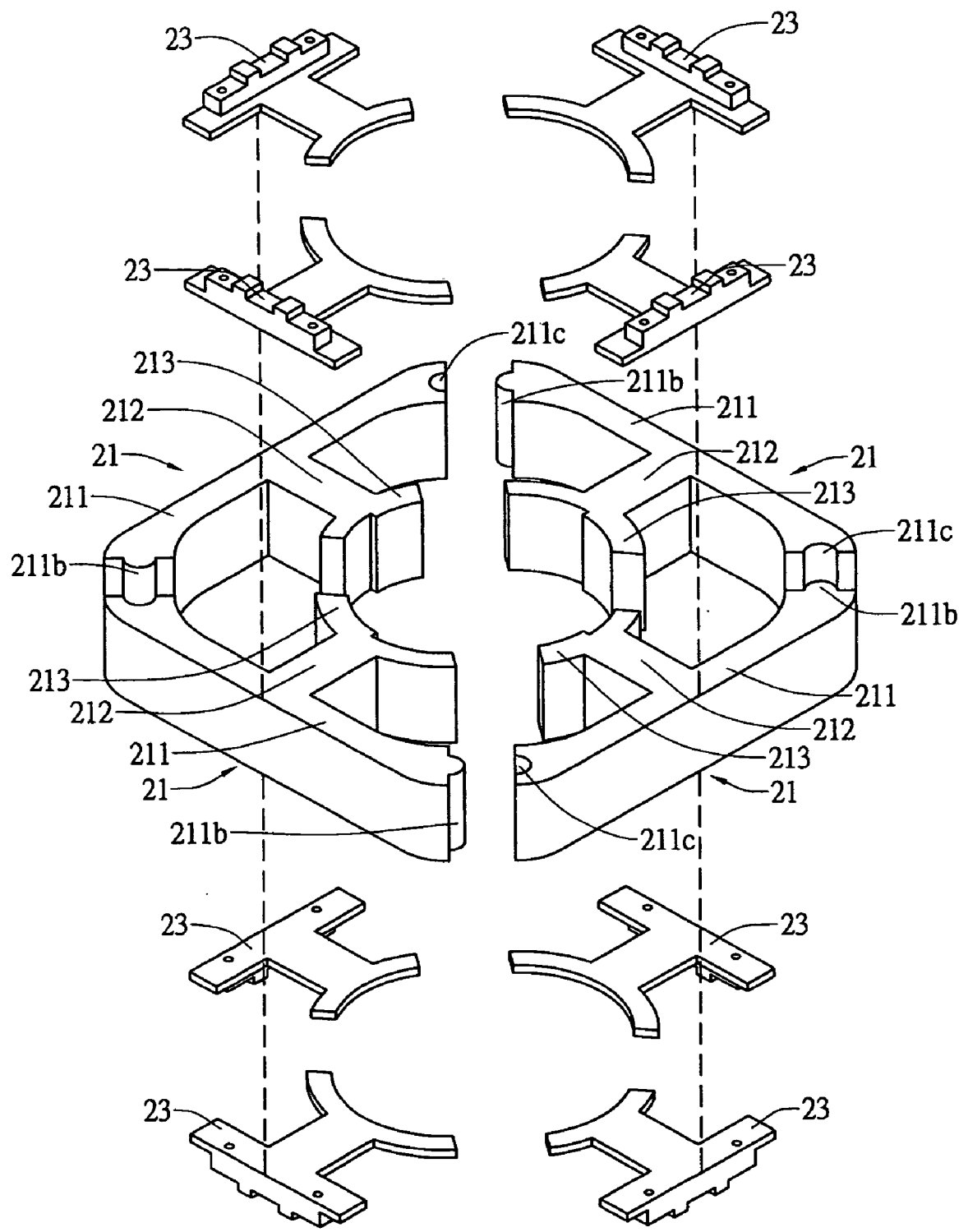
FIG. 12 is an exploded perspective view illustrating each of the magnetic guide members having an end joining part being a locating projecting bar and another end joining part being a recess.
Figure 13:
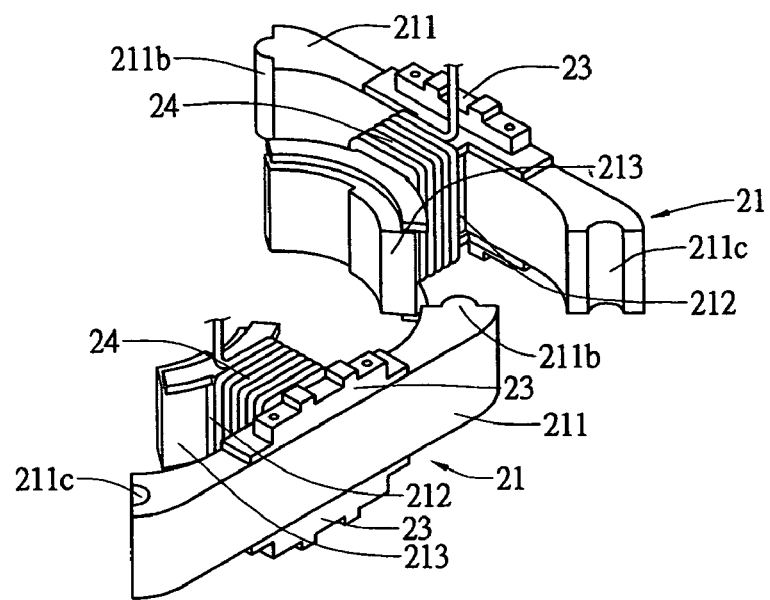
FIG. 13 is an exploded perspective view illustrating one of the magnetic guide members having an end joining part being a locating projecting bar and another end joining part being a recess.
Figure 14:
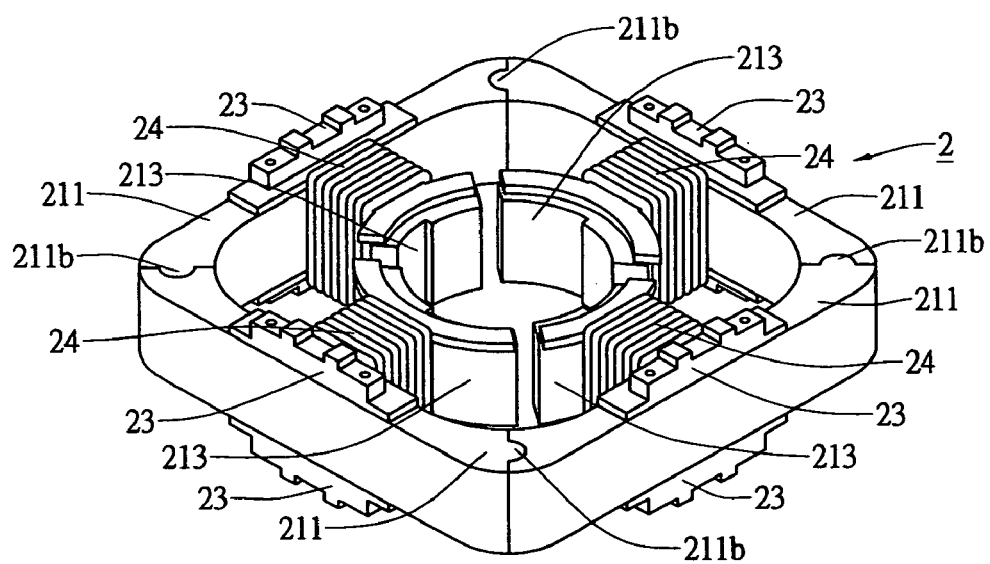
FIG. 14 is an assembled perspective view illustrating the magnetic guide members with an end joining part being a locating projecting bar and another end joining part being a recess respectively.
Figure 15:
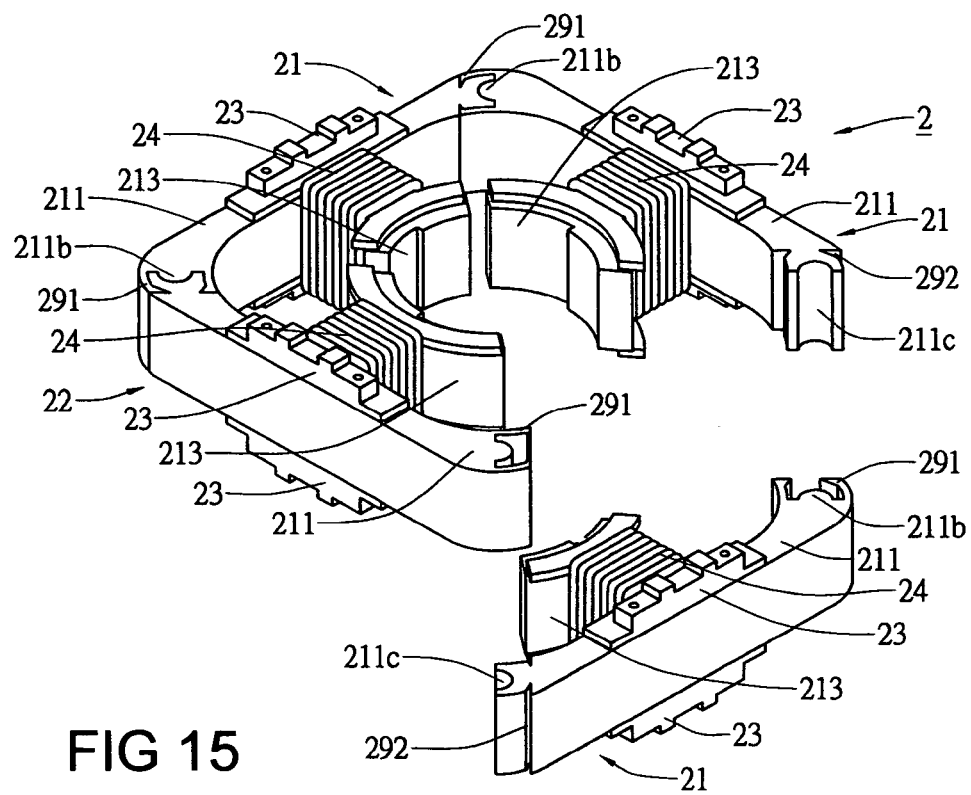
FIG. 15 is an exploded perspective view illustrating each of the magnetic guide members having an end joining part being a locating projecting bar and another end joining part being a recess and the magnetic guide members fitting with each other.
Figure 16:
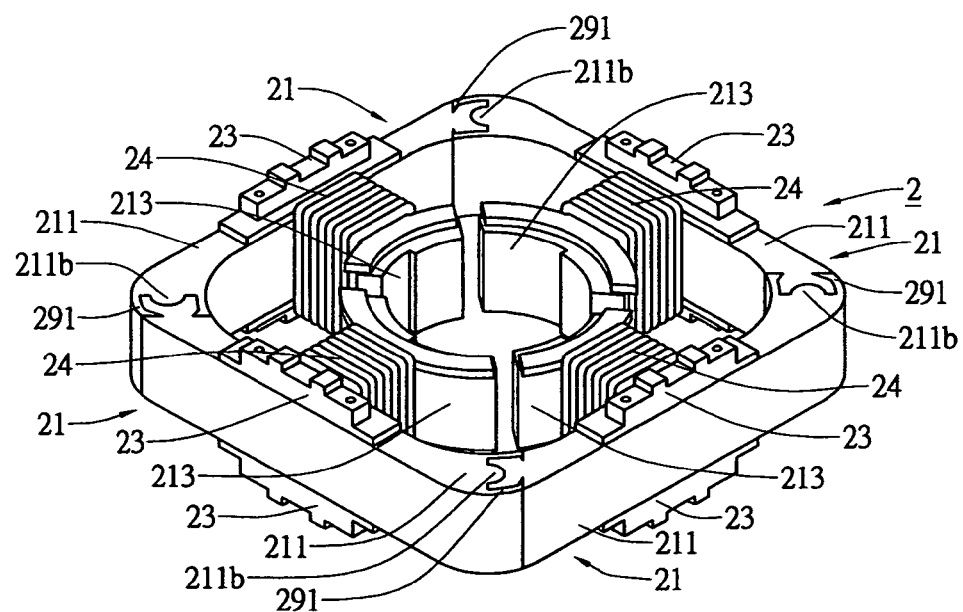
FIG. 16 is a perspective view illustrating each of the magnetic guide members having an end joining part being a locating projecting bar and another end joining part being a recess and the magnetic guide members fitting with each other.

In addition, referring to FIGS. 12, 13 and 14, each of the frame arms 211 has the joining part 211a at an end thereof being a projecting head 211b and that at another end thereof being a recess 221c respectively such that the projecting head 211b on one of the frame arms 211 can fit with the recess 221c on another one of the frame arms 211, which is next to the projecting head 211b. Referring to FIGS. 15 and 16, the projecting head 211b can extend a hook 291 and the recess 292 can provides a groove 292 corresponding to the hook 291 so that the hook 291 can engage with the groove 292.

Figure 17:
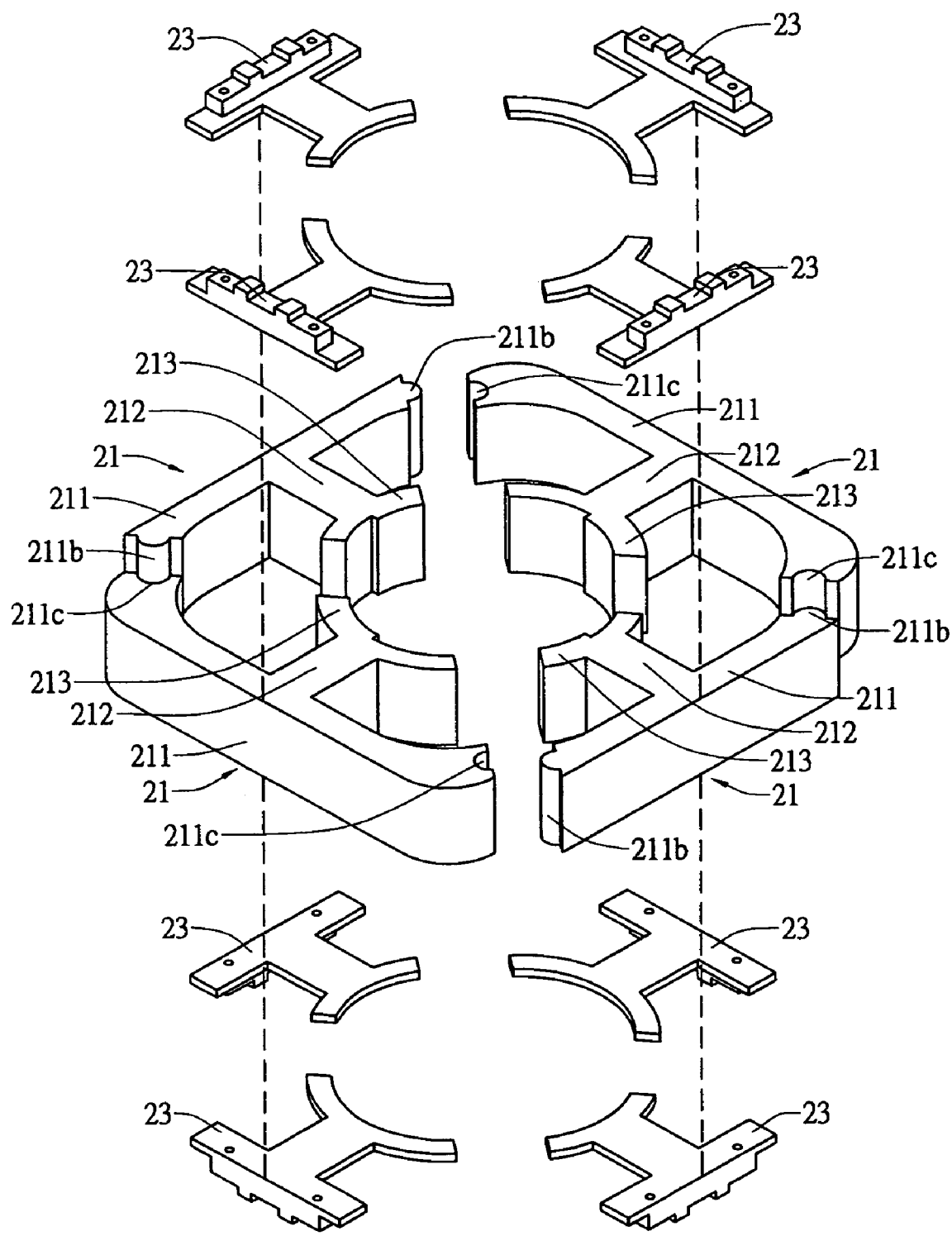
FIG. 17 is an exploded perspective view illustrating one of the magnetic guide members having joining parts at both ends thereof being a locating projecting bar respectively and another one of the magnetic guide members having joining parts at both ends thereof being a recess respectively.
Figure 18:
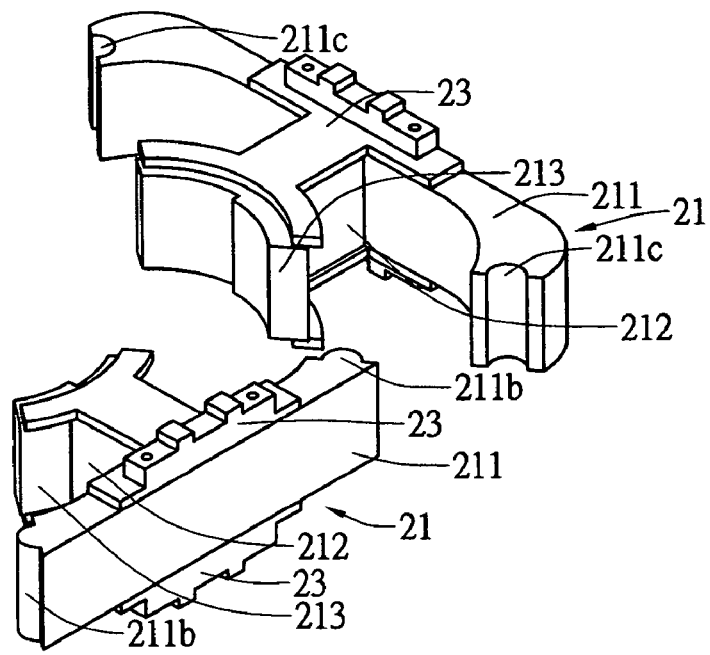
FIG. 18 is an exploded perspective view illustrating one of the magnetic guide members at both ends thereof being a locating projecting bar respectively and another one of the magnetic guide members at both ends thereof being a recess respectively.
Figure 19:
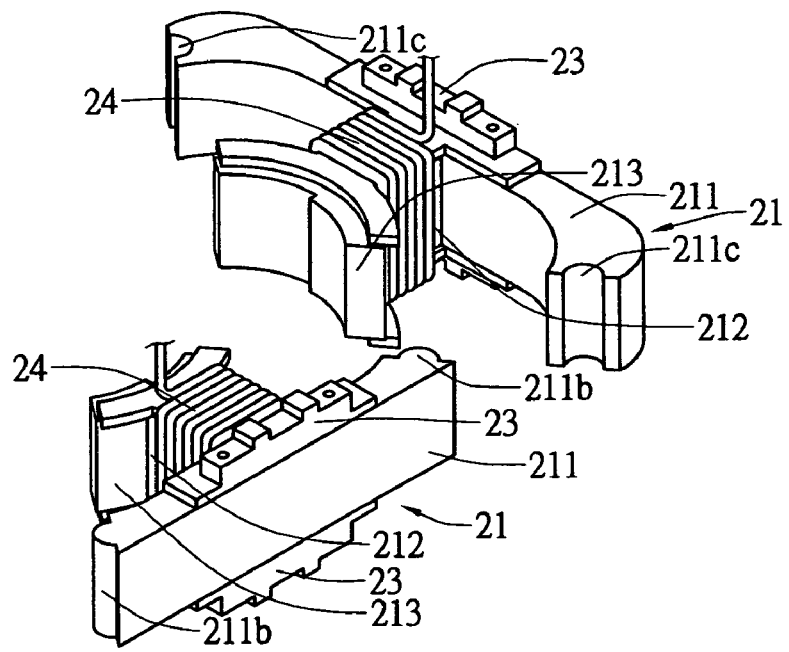
FIG. 19 is a perspective view similar to FIG. 18 illustrating both the magnetic guide members being attached with coils.
Figure 20:
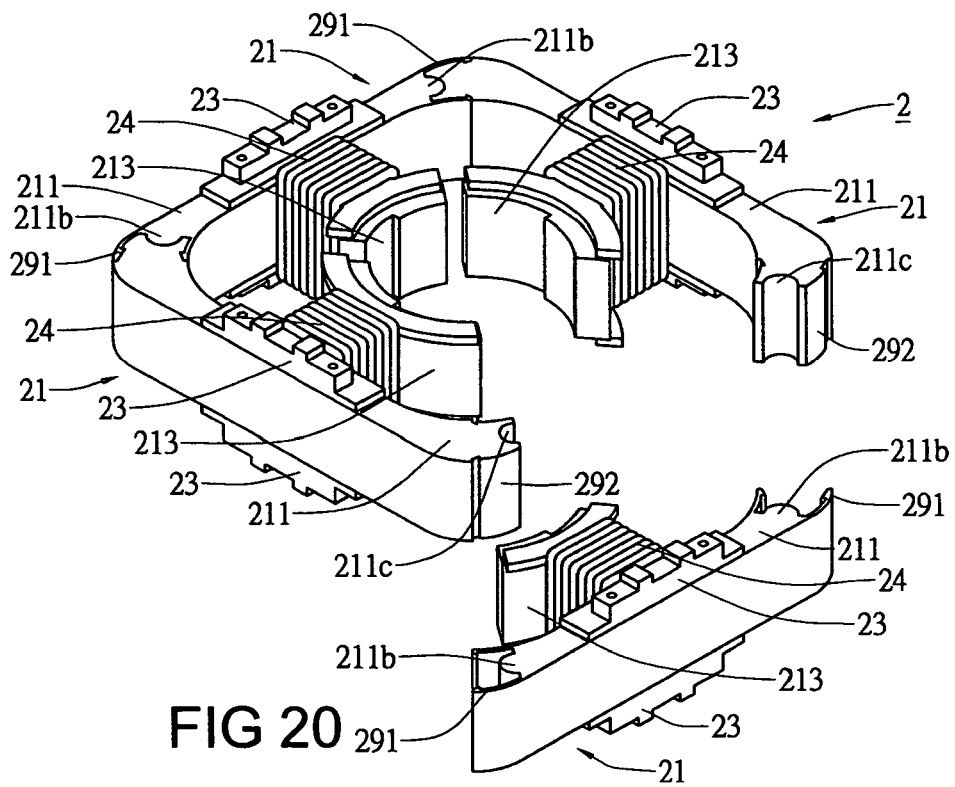
FIG. 20 is an exploded perspective view illustrating one of the magnetic guide members at both ends thereof being a locating projecting bar respectively and another one of the magnetic guide members at both ends thereof being a recess respectively and the magnetic guide members fitting with each other.
Figure 21:
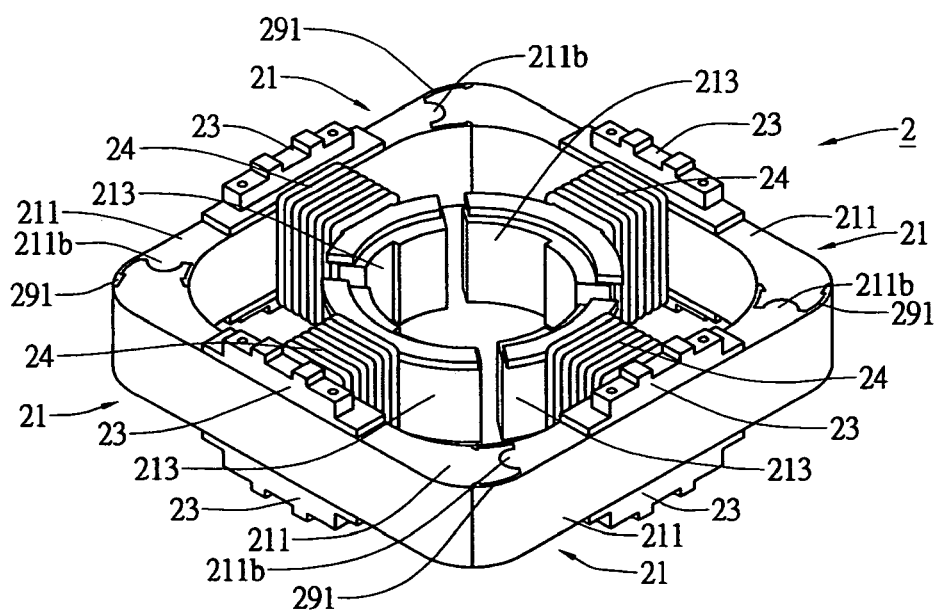
FIG. 21 is an assembled perspective view illustrating one of the magnetic guide members at both ends thereof being a locating projecting bar respectively and another one of the magnetic guide members at both ends thereof being a recess respectively and the magnetic guide members fitting with each other.

Further, referring to FIGS. 17, 18 and 19, one of the frame arms 211 has the joining parts 211a at both ends thereof being a projecting head 211b respectively and another one of the frame arms 211 next to the former one has the joining parts 211a at both ends thereof being a recess 221c respectively such that the projecting heads 211b on the former frame arm 211 can fit with the recesses 221c on latter frame arm 211. Referring to FIGS. 20 and 21, in order to enhance engagement, the projecting heads 211b can extend a hook 291 respectively and the recesses 292 can provides a groove 292 corresponding to the hook 291 respectively so that the hook 291 can engage with the groove 292 to intensify firmness.

While the invention has been described with referencing to preferred embodiments thereof, it is to be understood that modifications or variations may be easily made without departing from the spirit of this invention, which is defined by the appended claims.

What is claimed is:

1. A built-up stator assembly, comprising:
   four magnetic guide members, each of magnetic guide members being formed of a plurality of magnetic sheet plates;
   wherein, each of the magnetic guide members further comprises:
   a frame arm extending inward a rib from the center of the inner side thereof with an inner end the rib having an arc shaped magnetic pole part;
   an end plate, providing a shape similar to the magnetic sheet plates and being attached to two opposite lateral sides of the frame arm respectively; and
   a coil, being wound to surround the rib and the respective end plate;
   characterized in that an end of the respective magnetic guide member has first bent joining part, which has a circular projection head with a hook part extending outward to embrace the projection head and another end of the respective magnetic guide member has second bent joining part, which has a circular recess with a hook groove part at two opposite sides of the circular recess corresponding to the projection head and the hook part, such that the four magnetic guide members are capable of being joined to each other as a square shaped stator assembly by way of both the circular projection and the hook part of the first bent joining part engaging with the circular recess and the hook groove part.

2. A built-up stator assembly, comprising:
   four magnetic guide members, each of magnetic guide members being formed of a plurality of magnetic sheet plates;
   wherein, each of the magnetic guide members further comprises:
   a frame arm with extending inward a rib from the center of the inner side thereof with an inner end the rib having an arc shaped magnetic pole part;
   an end plate, providing a shape similar to the magnetic sheet plates and being attached to two opposite lateral sides of the frame arm respectively; and
   a coil, being wound to surround the rib and the respective end plate;
   characterized in that both ends of the frame arm have a bent joining part, which has a flat joining surface respectively, for the four magnetic guide members being capable of joining each other by way of adjacent two of the flat joining surface contacting to each other and a square outer frame member is provided to enclose the joined frame arms firmly.

3. A built-up stator assembly, comprising:
   two first and two second magnetic guide members, each of magnetic guide members being formed of a plurality of magnetic sheet plates;
   wherein, each of the magnetic guide members further comprises:
   a frame arm, providing a joining part at the two ends respectively extending inward a rib from the center of the inner side thereof with an inner end the rib having an arc shaped magnetic pole part;
   an end plate, providing a shape similar to the magnetic sheet plates and being attached to two opposite lateral sides of the frame arm respectively; and
   a coil, being wound to surround the rib and the respective end plate;
   characterized in that both ends of the frame arm of each first magnetic guide member have a bent joining part with a circular projection head and a hook part extending outward to embrace the projection head and both ends of the frame arm of each second magnetic guide members have another bent joining part with a circular recess and a hook groove part at two opposite sides of the recess corresponding to the projection head and the hook part, such that the first magnetic guide members are capable of being joined to the second guide members respectively as a square shaped stator assembly by way of both the circular projection and the hook part engaging with the circular recess and the hook groove.

4. The built-up stator assembly as defined in claim 1, wherein the circular projection head is provided instead of the circular projection associated with the hook part and the circular recess is provided instead of the circular recess associated with the hook groove part.

5. The built-up stator assembly as defined in claim 3, wherein the circular projection head is provided instead of the circular projection associated with the hook part and the circular recess is provided instead of the circular recess associated with the hook groove part.

* * * * *